United States Patent [19]
Kane et al.

[11] Patent Number: 6,109,717
[45] Date of Patent: Aug. 29, 2000

[54] MULTI-ELEMENT FLUID DELIVERY APPARATUS AND METHODS

[75] Inventors: Michael G. Kane, Skillman; Sterling Eduard McBride, Lawrenceville, both of N.J.; Pamela Kay York, Yardley; David N. Ludington, Newtown, both of Pa.

[73] Assignee: Sarnoff Corporation, Princeton, N.J.

[21] Appl. No.: 08/939,767

[22] Filed: Sep. 29, 1997

Related U.S. Application Data

[60] Provisional application No. 60/046,291, May 13, 1997.

[51] Int. Cl.$^7$ ..................................................... B41J 29/38
[52] U.S. Cl. ............................................................. 347/12
[58] Field of Search ................................ 347/12, 10, 19, 347/23, 16, 58, 180; 346/140.1

[56] References Cited

U.S. PATENT DOCUMENTS

| | | | |
|---|---|---|---|
| 5,103,246 | 4/1992 | Dunn | 347/58 |
| 5,422,665 | 6/1995 | Stephany et al. | 347/19 |
| 5,477,246 | 12/1995 | Hirabayashi et al. | 347/12 |
| 5,764,258 | 6/1998 | Hetzer et al. | |
| 5,774,137 | 6/1998 | Yoshida | 347/14 |

FOREIGN PATENT DOCUMENTS

| | | | |
|---|---|---|---|
| 362214963 | 9/1987 | Japan | 347/12 |

*Primary Examiner*—John Barlow
*Assistant Examiner*—Charles W. Stewart, Jr.
*Attorney, Agent, or Firm*—William J. Burke

[57] ABSTRACT

An apparatus and concomitant method for controlling the delivery of fluids and, in particular, to the delivery of fluids to a receptor, e.g., delivery of pigments to a printing media or delivery of fluids to a reaction cell.

21 Claims, 10 Drawing Sheets

MULTI-ELEMENT FLUID DELIVERY APPARATUS AND METHODS

This application claims the benefit of U.S. Provisional Application No. 60/046,291 filed May 13, 1997.

The present invention relates to an apparatus and concomitant method for controlling the delivery of fluids and, in particular, to the delivery of fluids to a receptor, e.g., delivery of pigments to a printing media or delivery of fluids to a reaction cell.

BACKGROUND OF THE INVENTION

The ability to reduce the size of an object is typically an important advance in different fields of technology, where such reduction increases efficiency, reduces cost and promotes portability, as evident by the success of traditional semiconductor techniques. In response, different industries have incorporated and modified various semiconductor techniques to reduce the size and cost of different products, e.g., various fluid delivery systems.

One example is the field of microfludic devices and methods as disclosed in U.S. Pat. No. 5,585,069 (Partitioned Microelectronic And Fluidic Device Array For Clininical Diagnostics And Chemical Synthesis) and U.S. Pat. No. 5,603,351 (Method And System For Inhibiting Cross-Contamination In Fluids Of Combinatorial Chemistry Device), which are incorporated herein by reference. These devices provide arrays having micron sized reservoirs and channels for delivery of a very small amount of fluids to a specific location, e.g., a receptor or reaction cell on the array.

Another example is the field of inkjet printing which offers a variety of techniques to print information, e.g., text and images, onto a receptor, such as paper, Mylar sheet or coated material. Many of the printing techniques are based on the physical transport of a pigment or ink from a reservoir to a receptor in a controlled manner. For example, FIG. 1 illustrates a typical printing system 100, which can be represented by three broad parts: 1) a storage 110 for the pigment, 2) a transport mechanism 120 to deliver the pigment and 3) a receptor 130 to receive the pigment, e.g., a print media.

The storage 110 can be implemented in a number of different manners, e.g., a toner cartridge for a laserjet printer that carries pigment in powder form, an inkjet cartridge for an inkjet printer that carries liquid pigment or a print ribbon in a dot matrix printer.

Similarly, the transport mechanism 120 can be implemented in a number of different manners, e.g., the formation and propulsion of droplets (or a spray of droplets) by mechanical means like thermal evaporation, acoustic waves or electrical means. Typically, the droplets exit the storage medium and travel a gap to reach the receptor. An example of droplets (or sprays) propulsion is illustrated by Choi et al., in Society for Imaging Science and Technology, pages 33–35, (1996), which incorporates electro-hydrodynamic (EHD) techniques for printing. An example of droplet formation is also illustrated by Crowley, U.S. Pat. No. 4,220,958 (Ink Jet Electrohydrodynamic Exciter).

However, the careful delivery of a large quantity of small amounts of fluid requires a complex control apparatus and method. Using the field of printing as an example, printing an image onto a receptor can, in principle, be accomplished one dot at a time. However, even small, low-resolution images may have many dots, and the process of printing a dot and moving the print head (or receptor) to the next dot location is relatively slow. Therefore, a print head may consist of multiple printing elements that print in parallel onto a first printing area and then the print head is moved to the next printing area and so on.

The number of positions that the print head must occupy relative to the receptor in order to print an entire image is simply the total number of possible dot locations divided by the number of printing elements in the print head. In order to minimize printing time, it is advantageous to maximize the number of printing elements on the print head.

However, some geometrical arrangements of printing elements are easier to drive or address than others. For example, a linear array of elements is simple to address, even when the total number of elements is large. All that is required is a linear array of multi-output drivers attached along the length of the array, where one driver output directly addresses one printing element. However, for a large array, many drivers are needed. For example, a 1000-element linear array requires 1000 drivers. For such a large array, arranging the printing elements in a two-dimensional matrix pattern is preferable. However, although a matrix pattern reduces electrical connections in general, such reduction is achieved at the expense of increasing the complexity in addressing such a large array of printing elements.

Therefore, a need exists in the art for an apparatus and concomitant method for controlling a plurality of fluid delivery elements to deliver fluids to a receptor.

SUMMARY OF THE INVENTION

The present invention is an apparatus and method for controlling the delivery of fluids to a receptor. In one embodiment, a passive and/or active matrix addressing method is employed to address and control a large array of fluid delivery elements. The invention also includes a method for operating the array, which allows for pump relaxation in the electrical signals provided to the array of fluid delivery elements. In another embodiment, a method is disclosed for achieving continuous fluid delivery (or "continuous tones" in the field of printing) by using binary-weighted intervals in which the pump-like fluid delivery elements are always operated full-on or full-off. The invention also includes a method for externally compensating nonuniformities in fluid delivery and a method for testing an active matrix array of fluid delivery elements prior to final assembly as a fluid delivery array. The invention also includes the use of an offset-drain transistor structure to permit active-matrix arrays to be operated at high voltages.

BRIEF DESCRIPTION OF THE DRAWING

The teachings of the present invention can be readily understood by considering the following detailed description in conjunction with the accompanying drawing, in which.

To facilitate understanding, identical reference numerals have been used, where possible, to designate identical elements that are common to the figures.

DETAILED DESCRIPTION

Figure 2:
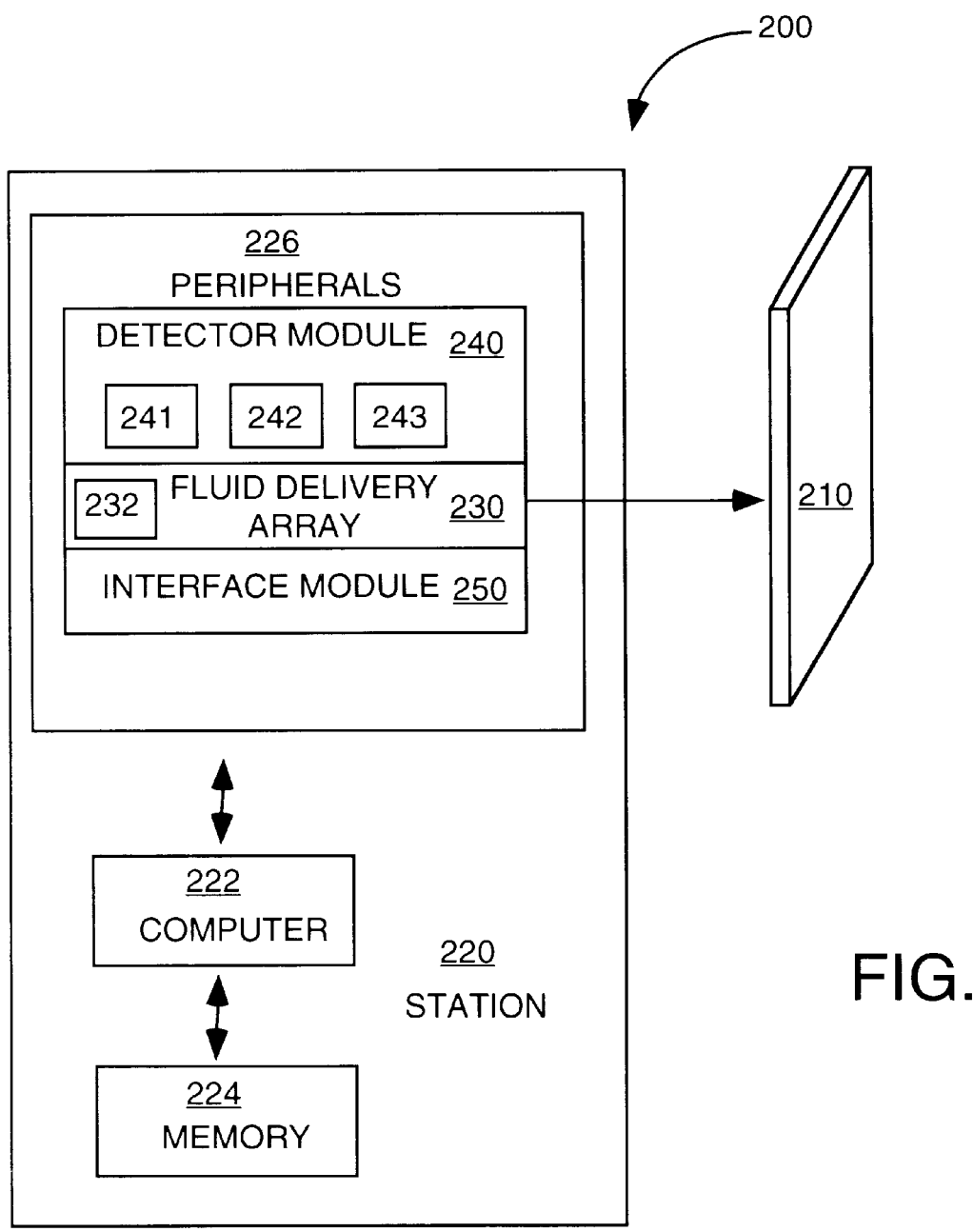
FIG. 2 depicts a system of the present invention adapted for effecting fluid delivery.

FIG. 2 depicts an interface module of the present invention residing within a fluid delivery system 200. The system 200 comprises a station 220 for delivering fluids to a receptor 210. The station 220 may comprise a general purpose computer (processor, microcontroller, or ASIC) 222, a memory 224 and peripheral devices 226. The computer is electrically coupled to the memory 224 which may be loaded with one or more software applications for controlling and communicating with the receptor 210.

In one embodiment, the station 220 is a laboratory station comprising the following peripheral devices: a fluid delivery array 230, detector module 240 and interface module 250. The fluid delivery array 230 includes an array support 232, which contains the necessary hardware to receive and support fluid delivery array 230. The array support 232 further serves to support the receptor 210 under the detector module 240. Suitable fluid delivery array and receptor supports or substrate holders are commercially available.

Detector module 240 serves to detect the occurrence of a suitable reaction within the surface of the receptor 210. Detector module 240 comprises one or more light sources 241, an optical fiber 242 and one or more light detectors 243 such as a florescence detector. The optical fiber 242 is operative to transmit light from the light source 241 to the light detector 243. Specifically, the detector module 240 measures the transmittance or absorbency of material on the surface of the receptor 210. The detector module 240 verifies the presence or absence of materials on the receptor surface and quantifies their amounts by transmitting the measurement data to the computer 222. Suitable lasers, photodetectors and fiber optic adapters for supporting the optical fiber are all commercially available. Furthermore, various fiber optic adapters may include a lens for efficient transfer of light from the light source into the optical fiber.

Interface module 250 serves as an interface for engaging the plurality of electrical connections (not shown) located on the fluid delivery array 230. These electrical connections provide the necessary signals for operating a plurality of EHD micropumps (shown in FIGS. 5–7 below), which are employed to regulate the flow of fluids from the reservoirs within the fluid delivery array 230 to a location on the surface of the receptor 210. The interface module 250 which is electrically connected between the computer 222 and the fluid delivery array 230, contains the necessary circuitry and connectors for selectively providing control signals from the computer to the EHD micropumps in the fluid delivery array 230.

It should be understood that the term EHD micropump as used in the present invention includes micropumps that may operate under one or more forces, e.g., electrokinetic forces such as electrophoretic and electroosmotic forces, coulomb forces, Kelvin polarization force, dielectric force and electrostrictive force. In fact, micropumps may operate under other phenomena, other than electrohydrodynamics, e.g., "electro-wetting".

To illustrate, for a particular process, the computer 222 may activate the EHD micropumps in accordance with a predefined sequence of steps where different fluids or reagents from within the fluid delivery array 230 are sequentially or simultaneously applied to a location on the surface of the receptor 210. Various combinations of the reagents can be applied to a location on the surface of the receptor 210. In this fashion, various combinatorial processes, including syntheses, screening and chemical diagnostic assays can be accomplished on a self-contained portable receptor. In fact, the receptor surface can be pretreated with any number of materials, e.g., a particular type of protein or amino acid, such that it is possible to measure the reaction or biologic activity of the pretreated material to the presence of a reagent or a sequence of different reagents as the reagents are applied to the receptor surface from the fluid delivery array 230.

Figure 1:
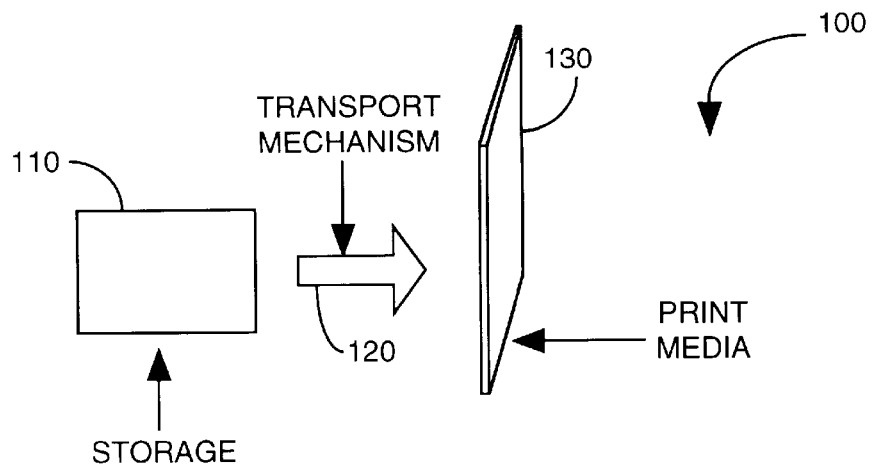
FIG. 1 depicts a prior art printing system.
Figure 3:
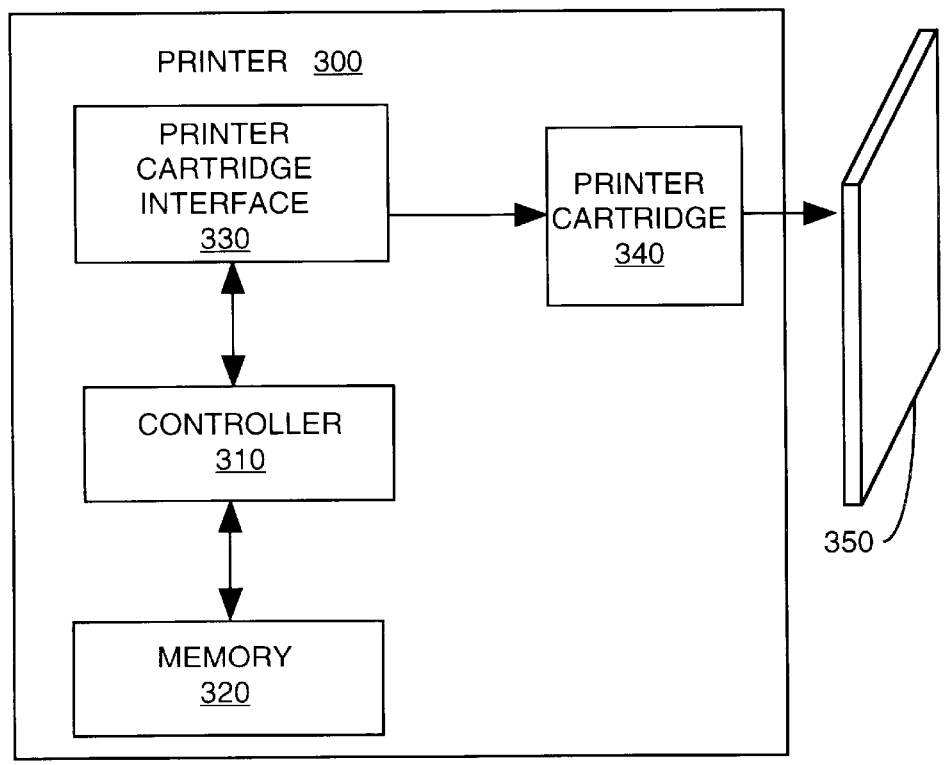
FIG. 3 depicts a block diagram of the interface module of the present invention residing within a printer system.

Alternatively, FIG. 3 illustrates a second embodiment where station 220 is a printing system 300. Namely, in this embodiment, FIG. 3 depicts a block diagram of a printer interface module (printer cartridge interface) of the present invention residing within a printing system 300, e.g., a printer. The printer 300 may comprise a general purpose controller (processor, microcontroller, or ASIC) 310, a memory 320, a printer cartridge interface 330 and a printer cartridge 340.

The controller 310 controls the printing operation of the printer and can be designed to receive print commands from a number of different devices, e.g., a computer, an imaging device or a digital camera. In fact, the controller 310 is electrically coupled to the memory 320 which may be loaded with one or more software applications for controlling the printer and communicating with the printer cartridge 340 via printer cartridge interface 330.

Printer cartridge interface 330 serves as an interface for engaging the plurality of electrical contacts (not shown in FIG. 3) or connections located on the printer cartridge 340. These electrical connections provide the necessary signals for operating a plurality of EHD micropumps (shown in FIGS. 5–7 below), which are employed to regulate the flow of fluids from the reservoirs within the printer cartridge 340 onto a surface of the receptor 350. The printer cartridge interface 330, which is electrically connected between the controller 310 and the printer cartridge 340, contains the necessary circuitry and connectors for selectively providing control signals from the controller to the EHD micropumps in the printer cartridge 340.

Figure 4:
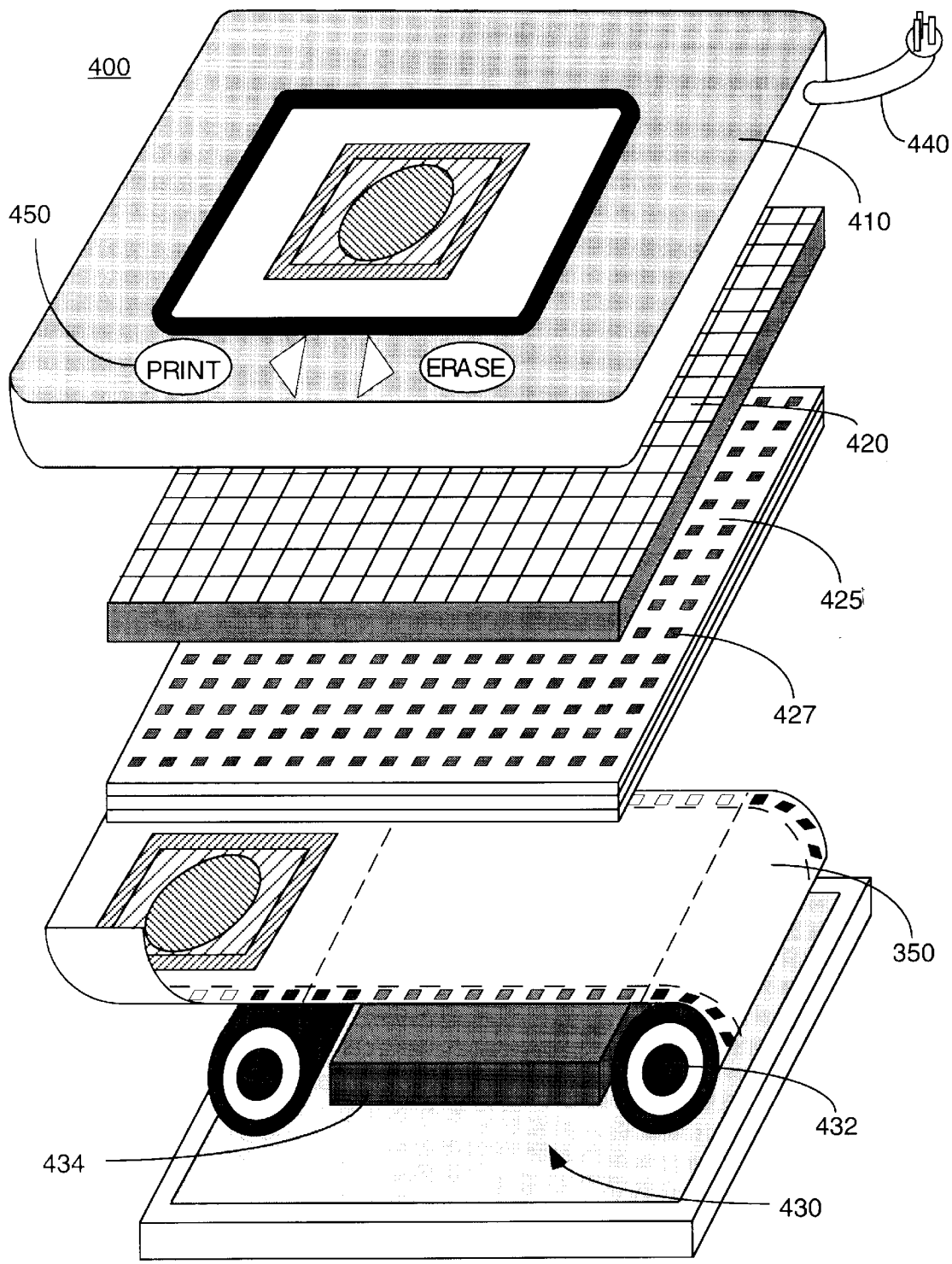
FIG. 4 illustrates one embodiment of the present printer interface module which is incorporated within a portable printer.

FIG. 4 illustrates one embodiment of the present printer cartridge interface 330 (illustrated with numeral reference 420 in FIG. 4), which is incorporated within an illustrative portable printer 400. In this embodiment, the portable printer 400 may comprise the following devices: a display (e.g., a liquid crystal display (LCD)) 410, a printer cartridge interface 420, a printer cartridge 425, a receptor support assembly 430, an interface connector 440 and various switches 450. The controller 310, memory 320 and a power source (e.g., batteries) are not shown in FIG. 4. Although the present invention offers various advantages that promote its use in a portable printer, it should be understood that the present invention is not so limited.

The interface connector 440 can be used to interface with an electronic photography device, e.g., an electronic camera. An electronic camera captures images as arrays of electrical charges using, for example, a CCD or CMOS imager, and stores the images in the same way that a computer stores graphics. The stored images can be displayed on computer monitors or television screens in real time (i.e., in the field) using, for example, liquid crystal displays or (at a considerable energy penalty) small cathode-ray tubes. Based on the real-time display, the photographer can choose to keep or to erase a specific picture. The retained images are stored on computer-compatible memory devices that can be subsequently transferred to, processed by, and/or printed by computers or by a portable printer 400 as illustrated in FIG. 4.

The interface connector 440 passes the stored images from the electronic camera to the memory 320 of the portable printer 400, where the stored images can be recalled and reviewed by the user. The memory 320 in the portable printer has a suitable storage capacity to receive a plurality of stored images.

The portable printer 400 may comprise an optional display 410 which serves to display the stored images to the user. In addition, a plurality of function keys 450 are provided to allow the user to scroll forward and backward, print or erase a set of stored images.

When the user wishes to print a stored image, the control signals representative of the desired stored image are passed to the printer interface module 420. As discussed above, the printer interface module 420 serves as an interface for engaging the plurality of electrical connections or contacts 427 located on the printer cartridge 425. These electrical connections provide control signals to a plurality of EHD micropumps which are employed to regulate the flow of fluids (ink or pigment) from the reservoirs within the printer cartridge 425 to a location on the receptor surface, thereby forming the desired stored image on the surface of the receptor 350.

It should be understood that the matrix-like structure of the interface module 420 can be implemented in an alternate embodiment, where the electrical connections are located along the periphery (minimum of two sides) of the interface module 420. In turn, the contacts 427 on the printer cartridge 425 are correspondingly also located along the periphery of the printer cartridge 425. Namely, the matrix-like structure can be implemented within the printer cartridge 425, thereby reducing the total number of electrical connections between the interface module 420 and the printer cartridge 425.

Finally, FIG. 4 illustrates a receptor support assembly 430 that serves to support the receptor 350 against the printer cartridge 425. In this embodiment, receptor support assembly 430 incorporates a pair of rollers 432 for advancing a roll of receptors with perforation. The perforation allows a "printed" receptor to be easily torn away from the roll of receptors.

The rollers also serve to apply pressure and align the receptor against the printer cartridge 425. In fact, pressure can be rendered more uniform than rollers can provide by incorporating an optional soft pad 434, (e.g., foam) pressing against the back of receptor 350.

Furthermore, the rollers may incorporate tracking teeth or guides for engaging guide apertures along the edges of the roll of receptors. Such tracking guides allow proper alignment of the receptor 350 with the printer cartridge 425. These tracking guides are commercially available. In addition, optional perforation can be implemented along the guide apertures so that they can be removed from the printed receptor.

However, the receptor support assembly 430 is not limited to a roller assembly implementation. In fact, the receptor support assembly 430 can be implemented using a spring loaded dispensing cartridge carrying a stack of receptors, e.g., similar to an instant film pack for instant cameras.

Figure 5:
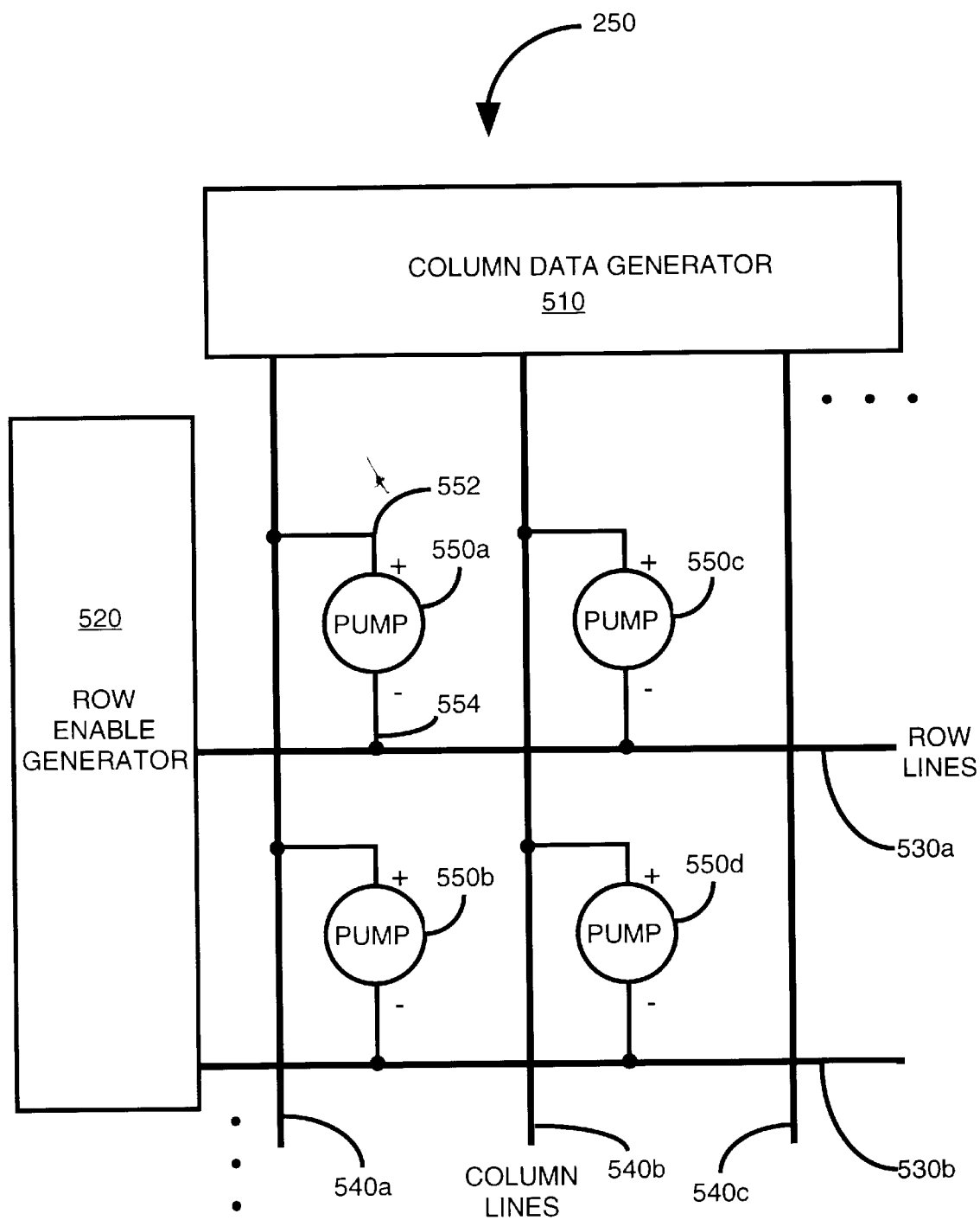
FIG. 5 illustrates a block diagram of the interface module implemented as a matrix addressing apparatus in combination with a two-dimensional array of fluid delivery elements.

FIG. 5 illustrates a block diagram of the interface module 250 and 330 implemented as a matrix addressing apparatus in combination with a two-dimensional array of fluid delivery elements. It should be understood that the term "matrix" as used in this application, refers to an electrical relationship rather than a physical relationship.

Namely, FIG. 5 illustrates a "passive" matrix array of microfluidic fluid delivery (pump-like) elements 550 which can be individually addressed and controlled. Although only four fluid delivery elements 550*a–d* are illustrated, it should be understood that the matrix can be implemented using any number of fluid delivery elements to satisfy the need of a particular application.

More specifically, a column data generator 510 and a row enable generator 520 collectively allow the computer 222 or controller 310 to selectively activate individual fluid delivery element 550 (or printing element in the field of printing). The generators 510 and 520 can be implemented as demultiplexers or shift registers that receive control signals from the computer 222 or controller 310 to generate or pass the necessary enable or data signals to each of the fluid delivery elements 550.

More specifically, the column data generator 510 is coupled to a plurality of column lines 540 and the row enable generator 520 is coupled to a plurality of row lines 530. A fluid delivery element is activated when both of its associated row and column lines are enabled simultaneously.

In the preferred embodiment, each fluid delivery element 550 consists of a microfluidic pump (micropump), e.g., an electro-hydrodynamic (EHD) pump with two terminals 552 and 554. Using the signals from the generators to apply a voltage across the terminals causes an electrical current to flow through the microfluidic pump. Microfluidic pumps and microfluidic pumping methods are disclosed for example in U.S. Pat. No. 5,585,069 issued Dec. 17, 1996, in U.S. Pat. No. 5,630,351 issued Feb. 18, 1997, Patent Cooperation Treaty Application with Ser. No. 95/14590 filed Nov. 9, 1995, and Patent Cooperation Treaty Application with Ser. No. 95/14586 filed Nov. 9, 1995. The disclosure of each of these patents and patent applications is incorporated herein by reference.

Returning to FIG. 5, in some types of pumps the polarity of the applied voltage determines the direction in which the fluid is pumped, so that the movement of the fluid can be controlled. Namely, the fluid can be pumped out of the array onto the receptor, or can be retracted into the array until, eventually, the pumps "run dry". The term "run dry" refers to the condition where the fluid retreats back the microchannel toward the reservoir and stops proximate to one of the pump electrode. Since the fluid in the microchannel is generally propelled by the electric field between the pump electrodes, once the fluid is outside of the electric field, the force on the fluid is removed and the fluid should stop proximate to one of the pump electrode.

Other types of pumps are polarity independent, and will always pump fluid in the same direction. In either case, application of zero volts to the pump for a sufficient time allows the pump to relax to its "ready to pump" state, where the fluid is only slightly retracted or extended from the exit orifices of the fluid delivery elements. Namely, a meniscus (concave or convex, depending on the orientation of the fluid delivery array) is formed at the exit orifices of the fluid delivery elements.

Furthermore, the specific nature of the fluids to be pumped also affects the behavior or operating characteristics of the pumps. Namely, it is well known that elements like viscosity, electric conductivity, surface tension, dielectric constant, density of the of the fluid and the applied electric fields, all contribute to how the fluid will be dispensed from the array and onto a receptor.

In the preferred embodiment, polarity dependent pumps are employed, due to the pumps' expected lower operating voltages. In the present invention, the labeling convention for the pump terminals is as follows: in order to pump fluid out of the fluid delivery element onto the receptor, the "+" terminal must be more positive than the "−" terminal.

Returning to FIG. 5, a "passive" matrix array is employed in the interface module 250 and 330, where each "+" terminal is connected to a column line 540 and each "−" terminal is connected to a row line 530. In order to selectively activate the fluid delivery elements, e.g., printing an image or dispensing a plurality of reagents to a reaction cell, rows are addressed one at a time driving the selected row to a negative voltage (enable voltage) $-V_{sel}$, while the unselected rows are kept at zero volts. Next, data voltages (enable voltage) in the range $[V_{d,min}, V_{d,max}]$ are applied to the column lines. Pumps in the selected rows experience applied voltages in the range $[V_{d,min}+V_{sel}, V_{d,max}+V_{sel}]$, while pumps in unselected rows experience applied voltages in the range $[V_{d,min}, V_{d,max}]$. The select voltage $-V_{sel}$ should be chosen such that $V_{d,min}+V_{sel}$ is sufficient to cause pumping, while $V_{d,max}$ is not. Namely, $V_{d,max}<V_{d,min}+V_{sel}$, yields the constraint on the minimum select voltage $V_{sel}>V_{d,max}-V_{d,min}$. This criterion minimizes inadvertent activation of an unselected fluid delivery element. In a typical embodiment, $V_{d,min}$ is approximately 10 volts and $V_{d,max}$ is approximately 20 volts. Although, a small forward voltage can be applied to an unselected pump, it is also possible to apply a reverse biased voltage to an unselected pump.

The present passive matrix method is particularly well suited to address EHD micropumps where the EHD micropumps do not require drivers having active elements, e.g., transistors or diodes. In other words, the row and column lines are passively coupled to the fluid delivery elements. In contrast, if the present passive matrix addressing method is applied to a matrix array with thermal resistive drivers, then the rows in the matrix array that are not selected may still pass some current (forward or reverse as discussed above). This "passed" current may still heat the resistive driver to some extent and may trigger the inadvertent ejection of fluid from an unselected resistive driver.

Returning to FIG. 5, an integrated fluid delivery array 230 is illustrated having the interface module with the array of microfluidic pumps 550. Specific to particular applications, FIG. 5 illustrates the concept of an integrated printer cartridge or array for the printing field and an integrated fluidic array for the combinatorial chemistry field, where the fluid delivery elements can be passively addressed. However, other implementations are possible as illustrated in FIGS. 2–4, where the interface module is a separate module from the fluid delivery arrays. Such fluid delivery array is also disclosed in a patent application with Attorney Docket #SAR 12524, which is filed simultaneously with this application and is herein incorporated by reference.

Furthermore, an alternative embodiment employs a passive matrix of pumps on the receptor 210 itself. Pumps simply bring fluids to the surface of the receptor. In this embodiment, conducting lines can appear on the top and/or bottom surface of the receptor or at the edges to effect electrical connection with a drive circuit, e.g., the passive matrix drive circuit discussed above. Such receptor is disclosed in a patent application with Attorney Docket #SAR 12523, which is filed simultaneously with this application and is herein incorporated by reference.

The above passive matrix addressing scheme as illustrated in FIG. 5 possesses excellent power requirement characteristics, where the voltages necessary to operate the fluid delivery elements are relatively low. However, due to its sequential addressing scheme, the total time necessary to address a large matrix array may not be appropriate for various applications.

Using a printer array as an illustration, assuming that no movement of the printer array is required, the total fluid delivery time (or print time) $T_{print}$ is simply the time required to print one dot $T_{dot}$ times the number of rows $N_{row}$. Since typically there are a few hundred rows per printer array, $T_{dot}$ must be small in order to keep $T_{print}$ manageable. For example, if 100 milliseconds is required to print each of 500 rows, then the total print time is about 50 seconds, which may be excessive for different applications.

Thus, one alternate embodiment involves the use of a dual scan method to reduce the fluid delivery time. Namely, the matrix array as illustrated in FIG. 5 is divided into two separate parts, e.g., a top portion and a bottom portion, with the column lines in the top portion driven by one column data generator and the column lines in the bottom portion driven by a second column data generator. In other words, a second column data generator (not shown) is incorporated to effect separate control of the two different portions of the matrix array. In fact, the matrix array can be further partitioned into any number of portions depending on the requirement of a particular application. Although the increase in partitions will increase the fluid delivery speed for the overall matrix array, such increase is offset by a corresponding increase in the complexity and cost of the matrix array. Additionally, in the field of printing, the various sets or partitions of drivers must be matched very closely in order to prevent visible lines in the printed image, e.g., at the boundaries of the partitions.

Another embodiment of the present invention incorporates the concept of a "relaxation period" for the fluid delivery element to address the criticality of "pump memory". Pump memory is the concept that a fluid delivery element may not necessarily be at a "neutral" state before it is activated. In fact, the previous state of the fluid delivery element plays an important role as to how it will behave when the fluid delivery element is activated. In other words, a fluid delivery element may have a predisposition to eject more fluid or a predisposition to eject less fluid based upon its previous state.

To illustrate, if a fluid delivery element was previously activated ("ON" state), there is a tendency for the fluid level within the fluid delivery element to be slightly advanced beyond its neutral level. This condition results from the fact that it takes a small amount of time for the fluid level to return to its neutral state. The advanced fluid level within a fluid delivery element may produce a significant increase in the amount of dispensed fluid. Depending on the application, such inadvertent discharge may cause a degradation in the printed image or incorrect results from a combinatorial process.

In addition, if a fluid delivery element was previously unselected ("OFF" state), there is a tendency for the fluid level within the fluid delivery element to be slightly below its neutral level. This condition results from the fact that a small reverse biased voltage may be applied to the unselected fluid delivery elements to ensure that these elements are not discharged. Again, the lower fluid level within a fluid delivery element may produce a significant decrease in the amount of dispensed fluid, thereby affecting the accuracy in the printed image or the results from a combinatorial process.

Finally, the relaxation period also addresses the problem where small forward motions of the fluid may accumulate at each of the unselected fluid delivery elements. For example, returning to FIG. 5, if pump element 550a is selected for activation and the activation voltage is 10 volts, then a voltage of +5 volts applied to column line 540a and a −5 volts applied to row line 530a will activate pump element 550a. However, even if all other illustrated lines are set to zero volts, some fluid delivery elements may still receive a small forward voltage. For example, a voltage potential of +5 volts is across pump element 550b (+5 volts on line 540a and 0 volt on line 530b); a voltage potential of +5 volts is across pump element 550c (0 volt on line 540b and −5 volts on line 530a); and a voltage potential of 0 volt is across pump element 550d (0 volt on line 540b and 0 volt on line 530b). Thus, unselected fluid delivery elements 540b and 540c both have forward voltages. Similar to the scenario described above for a fluid delivery element having a small reverse biased voltage, a small forward voltage may cause the fluid level within the fluid delivery element to be slightly displaced from its neutral state, i.e., advanced beyond its neutral level. Over time, such forward voltages may cause an accumulated motion of the fluid to such an extent that fluid is unintentionally dispensed from the fluid delivery element, thereby not only inadvertently discharging more fluid in general, but discharging fluid from an unselected fluid delivery element.

Thus, in a passive matrix array of fluid delivery elements, it is important to consider the behavior of unselected rows of elements. In one embodiment of the present invention, a "relaxation period" is provided before a given row of pumps becomes the active row and begins to pump in the forward direction. In the preferred embodiment, the relaxation period is approximately 1–10 msec. However, micropump characteristics, fluid characteristics and application specific requirements may dictate a different relaxation period. In fact, the relaxation period can be different for a previously unselected pump from that of a previously selected pump.

Furthermore, it may also be necessary to provide a relaxation period for a selected row that has just finished pumping. Such relaxation period allows the now unselected pumps to relax in order to provide controlled retraction of the ink or fluid to a neutral level. These relaxation periods are easily incorporated in the pulsed waveforms generated by the rowdriver circuits. More specifically, relaxation periods can be accomplished by grounding both electrodes of each fluid delivery element.

Figure 6:
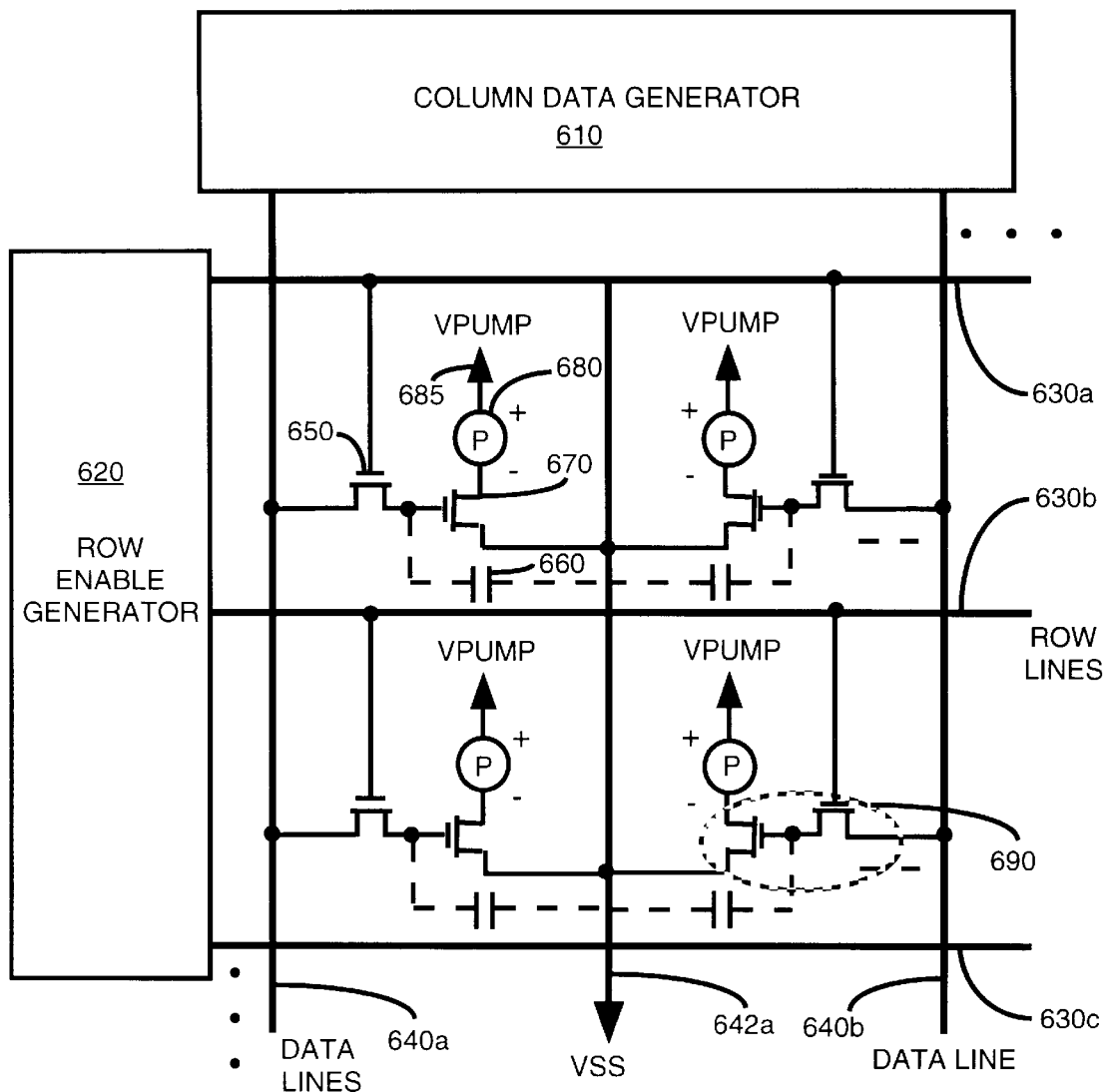
FIG. 6 illustrates a block diagram of a second embodiment of the interface module implemented as a matrix addressing apparatus in combination with a two-dimensional array of fluid delivery elements.

FIG. 6 illustrates a block diagram of a second embodiment of the interface module 250 and 330 implemented as a matrix addressing apparatus in combination with a two-dimensional array of fluid delivery elements. Namely, FIG. 6 illustrates an "active" matrix array of microfluidic fluid delivery (pump-like) elements 680 which are controlled by a plurality of individually addressable drivers 690. In this embodiment, rows (or columns) are selected one by one, just as in the passive matrix array, but as each row is selected, data is written from data lines into a storage node within the fluid delivery elements in that row. The stored voltage at each location controls the current through a drive transistor and the fluid delivery element. Thus, the fluid delivery element at each location dispenses fluid onto the receptor in accordance with the stored data voltage. Although only four fluid delivery elements 680 are illustrated, it should be understood that the matrix array can be implemented using any number of fluid delivery elements to satisfy the need of a particular application.

More specifically, each driver 690 comprises a pair of transistors 650 and 670, which are addressable via row (select) lines 630a–c and column data lines 640a–b. Column line(s) 642a provides a connection to a DC level VSS. In turn, the column data lines and row select lines are coupled to a column data generator 610 and a row enable generator 620 respectively, which collectively allow the computer 222 or controller 310 to selectively activate individual fluid delivery element 680. The generators 610 and 620 can be implemented as demultiplexers or shift registers that receive control signals from the computer 222 or controller 310 to generate or pass the necessary enable or data signals to the driver 690 of each fluid delivery element 680. The transistors 650 and 670 that form the driver 690 can be implemented using any number of different technologies, e.g., amorphous silicon thin film transistors, polysilicon thin film transistors, MOSFETs, or transistors constructed from other non-silicon semiconductors, such as cadmium selenide.

More specifically, the driver 690 is formed by connecting the gate of transistor 650 to the row line 630, connecting its source to data line 640 and connecting its drain to the gate of transistor 670. The drain of transistor 650 may also be coupled to an optional capacitor 660 for storing charge at the gate of transistor 670. In turn, the transistor 670 has its source connected to column line 642a (VSS) and its drain connected to one electrode of the fluid delivery element 680. The electrode (VPUMP) 685 of all the fluid delivery elements 680 is connected to a common electrical connection or bus, e.g., to a common supply level (not shown).

In operation, if a fluid delivery element 680 is selected to dispense fluid, then its corresponding select line 630 and data line 640 are enabled to cause the data to be loaded from the data line 640 through transistor 650 and stored on the gate of transistor 670. Namely, transistor 650 is turned "ON" and a voltage on the data line 640 is allowed to charge the gate of transistor 670. This storage of charge can be assisted by the optional capacitor 660. This "loading" of data is accomplished by sequentially activating each row select line of the matrix array. When the matrix array is completely loaded, all the transistors 670 are simultaneously turned "ON" via line 685 and all the selected fluid delivery elements 680 will dispense fluid at the same time.

As discussed above, before writing data into the active matrix array, a relaxation period is applied to all fluid delivery elements 680. Relaxation is accomplished by temporarily connecting the VPUMP "power lead" 685 to VSS 642. This action applies zero volts across all fluid delivery elements 680, thereby allowing them to relax. After the relaxation period is applied, data can be written into the matrix array, while VPUMP is still tied to VSS. Finally, when new data have been stored in all of the fluid delivery elements of the active matrix array, VPUMP can be again activated to the operating voltage, starting the fluid dispensing process. After this fluid dispensing interval is complete, VPUMP can be tied to VSS again, halting the dispensing, thereby again letting the fluid delivery elements 680 relax and so on.

Optionally, after the fluid delivery elements 680 have had an opportunity to relax, a low voltage can be written into all fluid delivery elements 680 in order to minimize bias stress on the active matrix transistors and to maximize transistor lifetime. This process can also be performed simultaneously with the pump relaxation period.

Using the field of printing as an illustration, the active matrix array permits the total print time (fluid dispensing time) $T_{print}$ to be reduced to approximately $T_{dot}$, the time required to print one dot, or the time to dispense one fluid delivery element. A small amount of time (approximately 20 msec.) is required to write data into the entire active matrix array, but such "load time" is negligible, when compared to the print time. Thus, the active matrix array provides an excellent improvement in the time necessary to dispense the entire matrix array.

More importantly, the present active matrix method is well suited for applications where the print time may be longer than the load time. For example, when the active matrix is used with EHD micropumps, it may take a short period of time to load or address the active matrix array, as compared to the period of time necessary for the EHD micropumps to complete their pumping functions. Thus, it is important to retain the loaded data while the printing is being performed. This unique feature also allows a method to address an entire matrix array (or a row or column in the array) and then move to address another entire matrix array (or another row or column), while the previously addressed array is printing.

Figure 7:
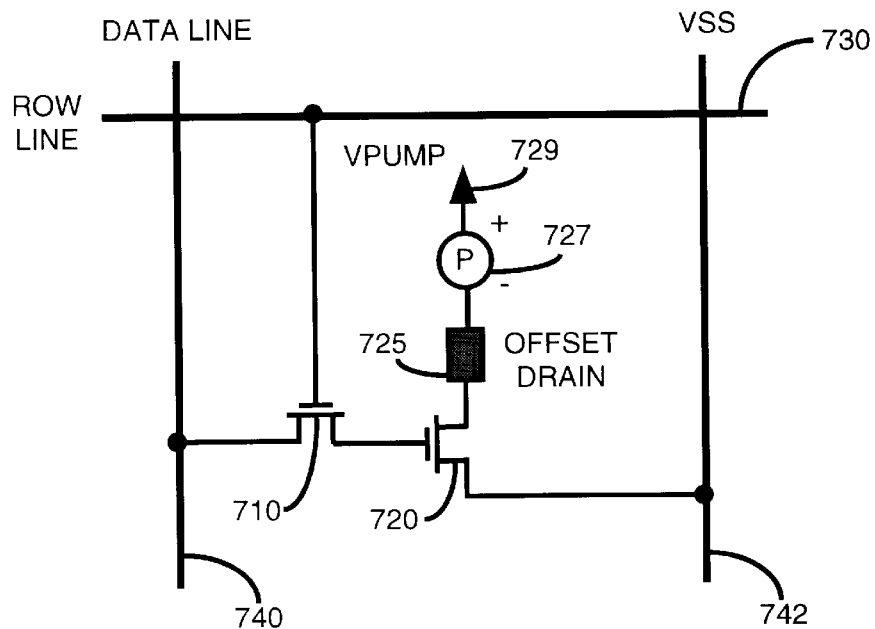
FIG. 7 illustrates a transistor with an offset-drain structure.

FIG. 7 illustrates an alternate embodiment to the active matrix array of FIG. 6. More specifically, FIG. 7 illustrates transistor 720 with an offset-drain structure 725.

Although many fluid delivery elements, e.g., EHD micropumps, can be operated with relatively low voltages, other fluid delivery elements may require operating voltages of 25 volts or higher. Such high voltages will typically cause transistors such as amorphous silicon thin film transistors to break down. Namely, when the fluid delivery element 727 is turned "OFF", the transistor 720 must withstand the entire operating voltage of the fluid delivery element 727, which equates to the voltage difference of VPUMP 729 and VSS 742. However, it should be noted that transistor 720 can be implemented without an offset-drain structure, when data voltages are low.

Thus, for high operating voltages, a high-voltage transistor 720 can be built using a drain-offset region 725 to reduce the electric field at the drain end of the gate. Devices with an offset drain can be operated at drain-to-source voltages of 100 volts or more. Thus, in one embodiment, a drive transistor 720 having an offset-drain structure 725 is implemented in an active matrix-fluid delivery element in order to control high operating voltages. An offset-drain structure can be used in various transistor technologies such as amorphous silicon TFTs, polysilicon TFTs, or bulk semiconductor MOSFETs.

Figure 8:
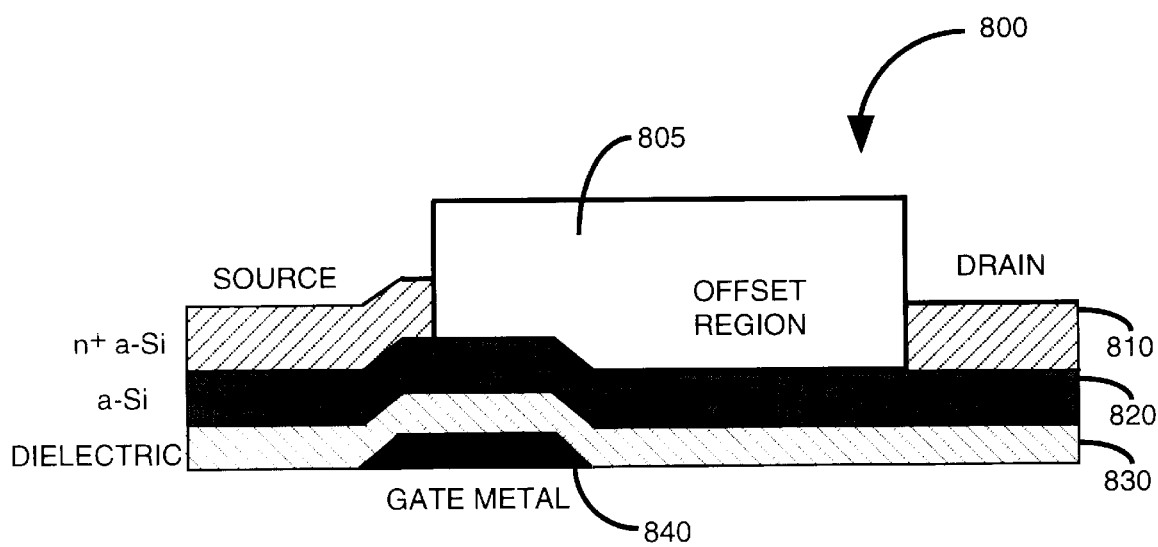
FIG. 8 is a schematic cross-sectional illustration of a transistor with an offset-drain structure in accordance with the present invention.

FIG. 8 is a schematic cross-sectional illustration of an illustrative transistor 800 with an offset-drain structure fabricated in amorphous silicon TFT technology. In brief, starting from the lowest layer, the transistor 800 comprises a gated region (gate metal) 840. A layer 830 of dielectric material is disposed over the gated region and serves as a gate insulator. Next, a layer of amorphous silicon 820 (a-Si) is disposed over the gate insulator and is followed by a layer of $n^+$ doped amorphous silicon 810 ($n^+$ a-Si). Finally, a passivation layer 805 is disposed over a portion of layer 810, thereby forming a transistor with an offset-drain structure. Transistors with an offset-drain structure are well-known in the art and a detailed description of such a transistor can be found in the reference, John G. Shaw et al., *Meta-stable Changes in the Output Characteristics of High-Voltage Amorphous Silicon Thin-Film Transistors*, Journal of Non-Crystalline Solids, 115, pp 141–143 (1989).

Figure 9:
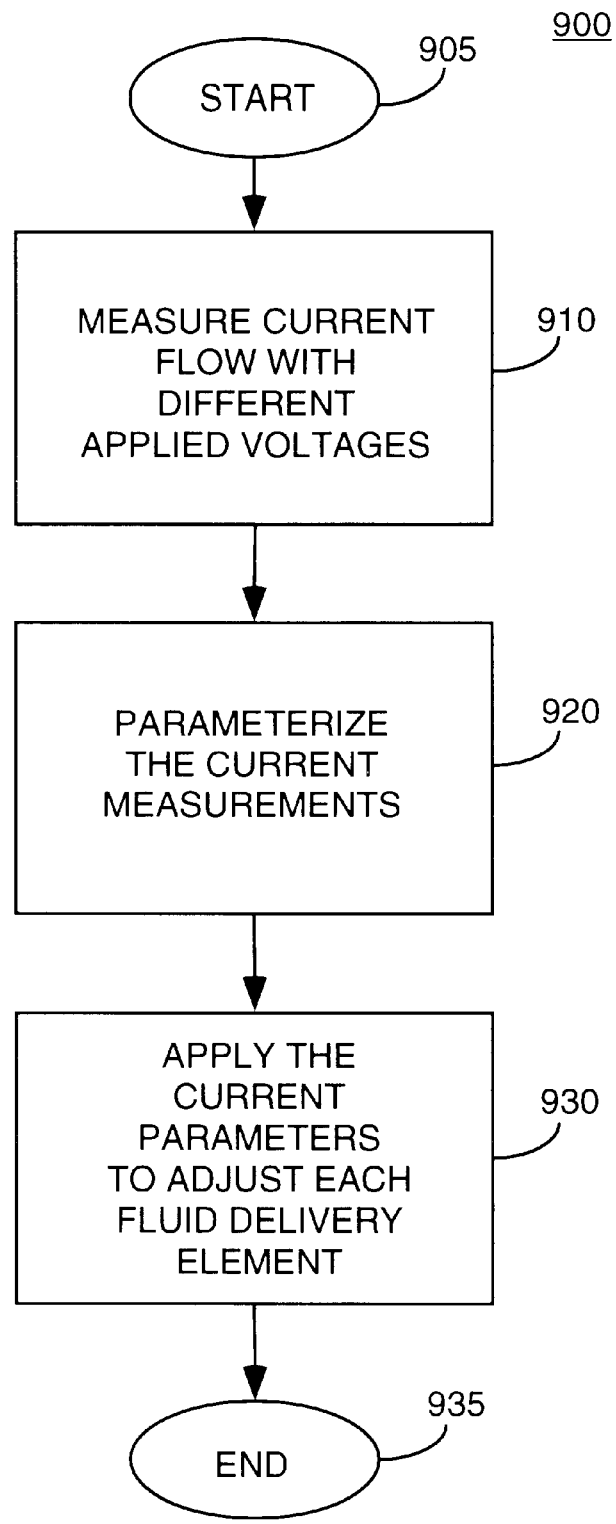
FIG. 9 illustrates a flowchart of a method for the detection and compensation of nonuniformity between the fluid delivery elements.

FIG. 9 illustrates a method for the detection and compensation of nonuniformity between the fluid delivery elements. More specifically, although all fluid delivery elements are constructed in a similar fashion, each physical fluid delivery element may exhibit a slightly different operating characteristics from that of another fluid delivery element. In fact, in different applications, such as the active matrix array, the deployment of thin film transistors may also contribute and exacerbate nonuniformity between the fluid delivery elements. Since the amount of dispensed fluid from each fluid delivery element is relatively small, such variations may lead to unacceptable visual non-uniformity in the printed images or inaccurate results in the field of combinatorial chemistry. The present invention discloses a method to detect the nonuniformities and then to measure a set of characteristics (current-voltage characteristics) that are used to correct or compensate for variations among the fluid delivery elements.

FIG. 9 illustrates a method 900 for detecting and compensating nonuniformity between fluid delivery elements. Method 900 begins at step 905 and proceeds to step 910, where the current flow in the matrix is measured in response to one or more data voltages. More specifically, this measurement can be taken at the VSS line 642a as illustrated in FIG. 6. (Alternatively, the current flowing from the VPUMP supply can be measured.) If there is more than one VSS line on the matrix array with each VSS line servicing a group of printing columns, then the current measurements can be performed on multiple blocks of columns at the same time. Thus, by turning on individual fluid delivery elements, one by one, the current-voltage characteristics of each fluid delivery element in the matrix array can be measured separately.

In step 920, the variations in the currents of the fluid delivery element are parameterized, where the parameters can be stored in the memory 224 or 320.

In step 930, the stored parameters (e.g., voltage information) are used to adjust or correct the data (current or voltage) that is applied to each fluid delivery element, thereby compensating for the nonuniformity of the fluid delivery elements. In step 935, the method ends.

The above method for detecting and compensating nonuniformity between fluid delivery elements is premised on the fact that, although fluid delivery elements may exhibit nonuniformity with a uniform fixed voltage, the nonuniformity can be accounted for with a uniform fixed current. Namely, the current can be associated more accurately with the fluid flow, where a voltage measurement may include other sources of voltage drop that are not associated with fluid flow.

In sum, method 900 determines the necessary voltage that must be applied to each fluid delivery element such that the proper current flows through all the fluid delivery elements. The stored voltage information can be retrieved from the memory and the adjustments can be made on the fly (or only during an initialization step) as the data is loaded as discussed above.

Alternatively, the fluid delivery array can be factory adjusted prior to shipment, thereby eliminating the need to store these adjustment parameters. In yet another alternate embodiment, it is also possible to regulate the flow of current directly to each fluid delivery element without having to modify the associated voltages. It should be understood that the detection and compensation method of 900 is not limited to a matrix configuration.

Figure 10:
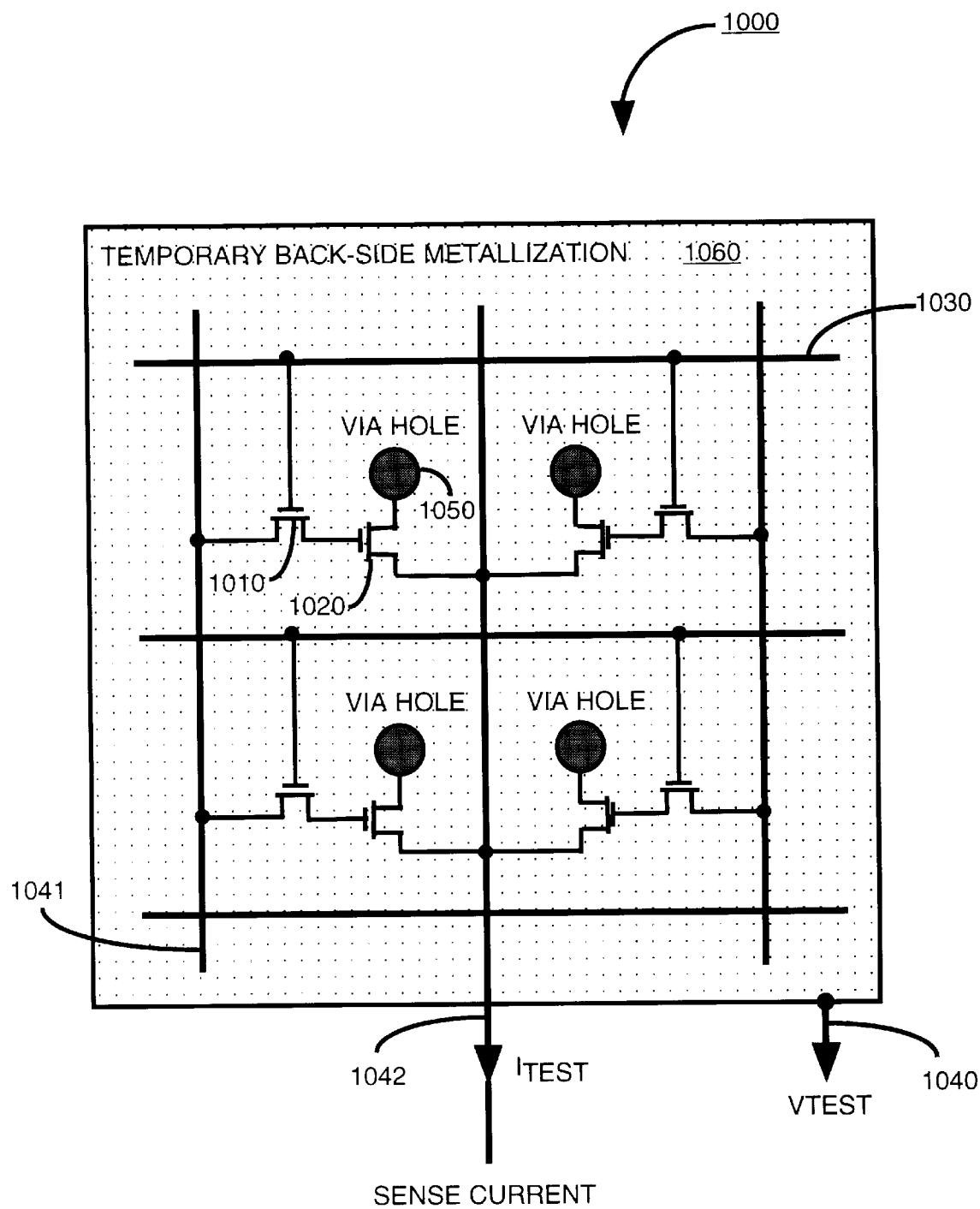
FIG. 10 illustrates an apparatus for testing the functionality of an matrix array.

FIG. 10 illustrates an apparatus 1000 for testing the functionality of an matrix array. More specifically, the apparatus 1000 is an interface module implemented as a matrix array on a substrate having a temporary metallization layer 1060 that allows the matrix array to be tested prior to its assembly into a printer or a combinatorial chemistry station. This apparatus is particularly well suited to verify an active matrix array where verification of the transistors is an important issue. Without the temporary metallization layer, testing must be conducted by assembling the interface module with a fluid delivery array and verifying that each fluid delivery element can be activated. In fact, it may be necessary to fill the fluid delivery array to observe actual movement of the fluids to verify the integrity of the interface module. Such testing is costly and requires a small amount of fluid in the delivery array to be discharged, which may not be desirable for certain applications. Namely, testing a transistor array before assembly minimizes the expenditure on detection of nonfunctional arrays.

FIG. 10 illustrates an interface module (matrix array) 1000 where the fluid delivery elements are omitted and replaced with "via holes" 1050. As discussed above and illustrated in FIG. 4, the interface module can be implemented without the fluid delivery elements, which are located on a different module, e.g., on a printer cartridge 425.

To illustrate, the interface module may contain only the necessary drivers for each of the fluid delivery elements, including a plurality of electrical contacts or connections (via hole 1050) for coupling with a plurality of contacts or connections 427 on the printer cartridge 425. The via holes 1050 extend from the drain of transistor 1020 through the interface module to a location on the backside of the interface module. When the interface module is aligned with the printer cartridge 425, the via holes 1050 will be aligned with the contacts 427 on the printer cartridge, thereby providing the necessary paths to activate the fluid delivery elements on the printer cartridge 425.

The electrical connections from the interface module (matrix array) to the fluid delivery elements are made through via holes filled with a conductive material. The via holes 1050 could be deposited in the active matrix substrate, or on a plate that is coupled to the active matrix substrate. In either case, the via-holes 1050 can be covered with a temporary metallization layer 1060 to act as a temporary common connection for all locations, i.e., all fluid delivery elements. The current flow in the active matrix 1000 can be measured using this common connection (illustrated as VTEST 1040) or at the matrix VSS line(s) 1042.

Figure 11:
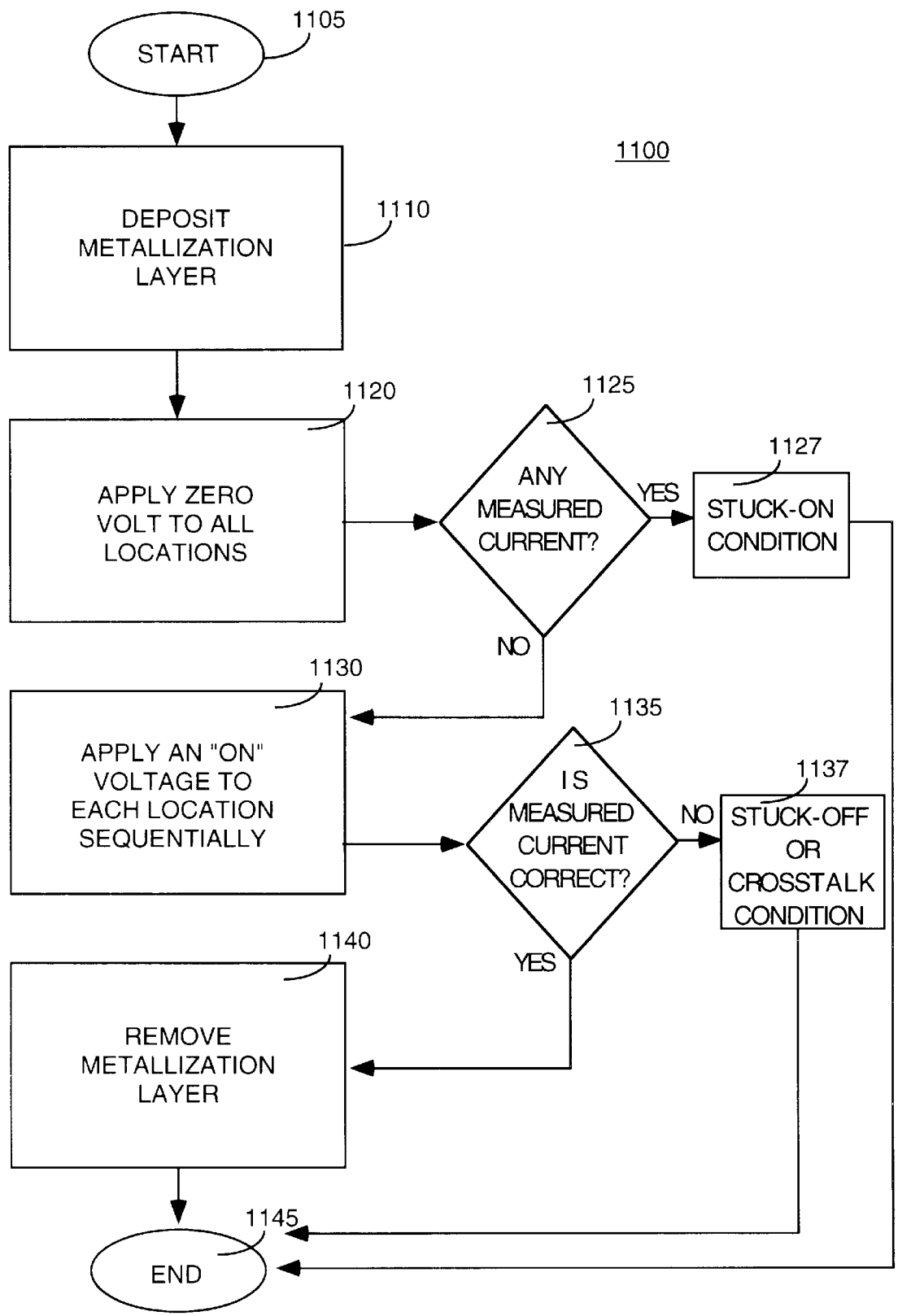
FIG. 11 illustrates a method for testing the interface module.

FIG. 11 illustrates a method 1100 for testing the interface module 1000. The method 1100 starts at step 1105 and proceeds to step 1110, where a metallization layer is deposited onto the interface module.

In step 1120, zero volt data is applied or loaded into all locations (drivers), i.e., via lines 1030 and 1041 to all the transistors 1010 and 1020.

In step 1125, method 1100 queries whether any current flow is measured. If the query is affirmatively answered then method 1100 proceeds to step 1127, where the interface module is deemed to have the faulty condition, "stuck ON" for at least one location. Method 1100 then ends at step 1145. If the query is negatively answered then method 1100 proceeds to step 1130.

In step 1130, method 1110 applies the proper operating voltage to each location to simulate the "ON" condition. The voltage is applied to each location sequentially, one by one, to detect the faulty condition, "stuck-OFF".

In step 1135, method 1100 queries whether a correct current flow is measured for all locations. If the query is affirmatively answered, then method 1100 proceeds to step 1140, where the metallization layer is removed and the interface module is deemed functional. If the query is negatively answered, then method 1100 proceeds to step 1137, where the interface module is deemed to have a faulty condition. Namely, if an incorrect current flow is detected, e.g., no current is measured from a selected location or a current is measured from an unselected location, i.e., turning one location "ON" and measuring currents from two locations, then a stuck-off condition or a crosstalk condition exists and the interface module is deemed to be faulty. Method 1100 then ends in step 1145.

Finally, the current-voltage characteristics of all the locations in the active matrix can also be measured, by sensing the current that flows in response to one or more data voltages as discussed above. Namely, it is possible to conduct a non-uniformity analysis using the temporary metallization layer. One benefit is that it is easier to conduct the non-uniformity analysis without the fluid delivery elements, i.e., no fluid is dispensed. Another benefit is the ability to evaluate the non-uniformity with regard to only the drivers themselves. These measurements provide insights into the cause of the non-uniformity within a fluid delivery array, thereby allowing a compensation method to be devised and implemented.

The present invention also provides a method of controlling the fluid delivery array for continuous tone fluid dispensing using a binary-weighted dispensing intervals. Again, using the field of printing as an example, printing typically is a binary process in which each pixel (location) on the receptor either receives ink or no ink, with nothing in between. For color printing, each of the three or four color inks is either present or absent from a given point, e.g., as in most ink-jet printers. However, some ink-jet printers purport the ability to emit partial-drops of ink, but such technique still requires some form of half-toning or spatial dithering to obtain gray levels or continuous color tones. Half-toning or spatial dithering techniques often compromise the resolution of an image.

Since EHD micropumps are able to provide a continuous stream of fluid, any amount of fluid can be deposited onto a receptor. In contrast, in the field of inkjet, the amount of fluid is limited by the size of a fluid drop. Thus, EHD micropumps are well suited to provide gray levels and continuous tones directly, without employing half-toning or spatial dithering.

One method is to operate the EHD micropumps using analog voltage levels, as in an analog display such as liquid crystal display (LCD). However, this method requires a digital-to-analog (D/A) converter to convert a digital signal, e.g., digital image data, into the appropriate analog levels. If the required analog levels are higher than 10 volts, driver chips are not commercially available, and custom high-voltage analog drivers are required. Thus, the present invention discloses an alternative method to achieve gray levels and continuous-tone color without the need to convert the digital into an analog signal.

Figure 12:
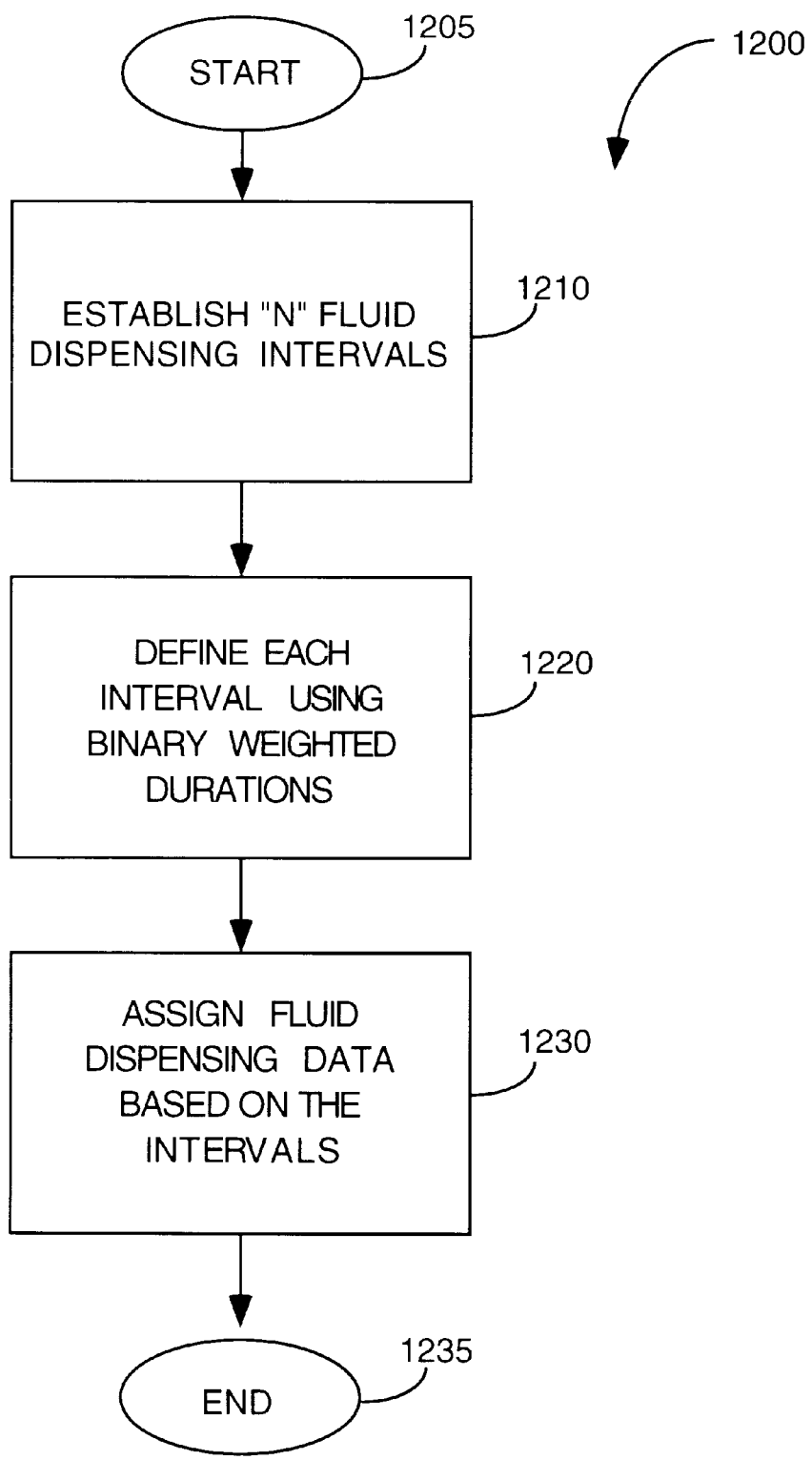
FIG. 12 illustrates a method for controlling a fluid delivery array for continuous tone fluid dispensing using a binary-weighted dispensing intervals.

FIG. 12 illustrates a method 1200 for controlling the fluid delivery array for continuous tone fluid dispensing using a binary-weighted dispensing intervals. The method starts at step 1205 and proceeds to step 1210 where N fluid dispensing intervals are established. Namely, the fluid dispensing period for each row (in the case of a passive matrix) or for the entire array (in the case of an active matrix), is divided into N intervals, where N is the number of bits in the binary data. However, other fluid dispensing periods can be used to derive or adjust the N intervals.

For example, in the field of printing, the fluid dispensing period can be based on the time it takes to print the darkest shade of a particular color, the total number of available colors, or the maximum time that is allotted to print a particular image. Similarly, in the field of combinatorial chemistry, the fluid dispensing period can be based on the maximum time it takes to dispense a particular reagent, e.g., the maximum amount of fluid one would deposit onto a particular receptor. Thus, the fluid dispensing period can be selected for a particular application to account for speed, resolution, and/or volume.

In step 1220, the N intervals are defined using binary weighted durations. Namely, the N intervals are not of equal duration. Rather, their durations are binary-weighted, with a first interval lasting a fluid dispensing time T, a second interval lasting a fluid dispensing time 2T, a third interval lasting a fluid dispensing time 4T, and so on, until the last interval lasts a fluid dispensing time of $2^{N-1}T$. Each fluid delivery element is either on or off during each interval, i.e., there are no intermediate levels of dispensing.

In step 1230, fluid dispensing data are assigned and based on the N intervals. To illustrate, for a given fluid delivery element, if the least significant bit of its digital data has a value of zero, it is written with zero data so that it does not dispense fluid during the first interval. Namely, the fluid delivery element's data enable lines are not activated.

If its least significant bit has a value of one, it is written with high-voltage data so that the fluid delivery element dispenses fluid during this interval. Namely, the fluid delivery element's data enable lines are activated. The same procedure is carried on for each of the successive bits in the digital data, until after the last interval, where the gray level or continuous tone has been built up during the successive binary-weighted fluid dispensing intervals. Again, the total number of data bits can be adjusted for a particular application. Method 1200 ends in step 1235.

The time required for binary-weighted fluid dispensing is essentially the same as would be required using regular analog technique, since in both cases enough time must be allotted for the maximum volume of fluid to be dispensed at the maximum dispense rate. Binary weighted fluid dispensing may not only be simpler, but also more accurate if the flow-rate characteristics of the fluid delivery element tend to saturate at high drive levels due, for example, to viscous forces in the fluid. In that case, fluid delivery element-to-fluid delivery element nonuniformities can be minimized when the fluid delivery elements are operated at "full" on.

It should be understood that the above matrix array apparatus and methods (active or passive), are not limited to a particular addressing method or structures with regard to a row or column configuration. Namely, the functions of rows and columns can be interchanged as are the components that are coupled to these rows and columns. The determining factor is that the best use of time is achieved when as many locations as possible are activated (for fluid dispensing) at the same time.

For example, because displays typically have more pixels in the horizontal direction than in the vertical direction, displays typically activate one row at a time rather than one column at a time. However, if the printed image has more pixels along the vertical direction than the horizontal direction, then the functions of rows and columns as disclosed can be interchanged.

It is to be understood that the apparatus and method of operation taught herein are illustrative of the invention. Modifications may readily be devised by those skilled in the art without departing from the spirit or scope of the invention.

What is claimed is:

1. A method for controlling a plurality of electrohydrodynamic (EHD) pumps arranged in a matrix configuration addressable by a first set of lines and a second set of lines, said method comprising the steps of:
   (a) using a first line from the first set of lines to address a set of the electrohydrodynamic (EHD) pumps, where said first line is passively coupled to said set of the electrohydrodynamic (EHD) pumps; and
   (b) using one or more lines from the second set of lines to activate selected electrohydrodynamic (EHD) pumps from said set of electrohydrodynamic (EHD) pumps, where said set of second lines is passively coupled to said set of the electrohydrodynamic (EHD) pumps.

2. The method of claim 1, further comprising the steps of:
   (c) repeating steps (a) and (b) using a next line from the first set of lines until the entire matrix configuration is addressed.

3. The method of claim 1, wherein the first set of lines are coupled to a row enable generator and the second set of lines are coupled to a column data generator.

4. The method of claim 1, wherein the second set of lines are coupled to two or more column data generators.

5. A method for controlling a plurality of electro-wetting pumps arranged in a matrix configuration addressable by a first set of lines and a second set of lines and a second set of lines, said method comprising the steps of:
   (a) using a first line from the first set of lines to address a set of the electro-wetting pumps where said first line is passively coupled to said set of the electro-wetting pumps; and
   (b) using one or more lines from the second set of lines to activate selected electro-wetting pumps from said set of electro-wetting pumps, where said set of second lines is passively coupled to said set of the electro-wetting pumps.

6. An apparatus for controlling a plurality of electrohydrodynamic (EHD) pumps arranged in a matrix configuration, said apparatus comprising:
   a plurality of electrohydrodynamic (EHD) pumps:
   a first set of electrical lines for passively coupling to the plurality of the electrohydrodynamic (EHD) pumps; and
   a second set of electrical lines for passively coupling to the plurality of the electrohydrodynamic (EHD) pumps, where by using one of said first electrical lines and one or more of said second set of electrical lines, a selected set of said plurality of the electrohydrodynamic (EHD) pump is activated.

7. A method for controlling a plurality of fluid delivery elements arranged in a matrix configuration addressable by a first set of lines and a second set of lines, said method comprising the steps of:

(a) using a first line from the first set of lines and one or more lines from the second set of lines to store data to a selected set of fluid delivery elements from said plurality of fluid delivery elements;

(b) repeating step (a) using a next line from the first set of lines until the entire matrix is addressed; and (c) activating simultaneously said selected fluid delivery elements in the entire matrix configuration.

8. The method of claim 7, wherein said fluid delivery elements are electrohydrodynamic (EHD) pumps.

9. The method of claim 7, wherein said fluid delivery elements are electro-wetting pumps.

10. The method of claims 7, wherein said step (a) uses said first and said second lines to store said data through a driver.

11. The method of claim 10, wherein said driver comprises a first transistor and a second transistor.

12. The method of claim 11, wherein said second transistor includes an offset drain structure.

13. An apparatus for controlling a plurality of fluid delivery elements arranged in a matrix configuration, said apparatus comprising:

a first set of electrical lines;

a plurality of first transistors, where each of said first transistors is coupled to one of said first set of electrical lines;

a plurality of second transistors, where each of said second transistors is coupled to one of said plurality of first transistors; and a second set of electrical lines, where each of said second set of electrical lines is coupled to one of said plurality of first transistors, where by using one or more of said first electrical lines and one or more of said second set of electrical lines, a selected set of said plurality of the fluid delivery elements is loaded with data, where said data are used to activate said selected set of said plurality of the fluid delivery elements simultaneously.

14. The apparatus of claim 13, further comprising a plurality of capacitors, where each of said capacitors is coupled to one of said second transistors to assist in a storage of said data.

15. A system for moving fluids to a receptor, said system comprising:

a controller;

a fluid delivery array having a plurality of electrohydrodynamic (EHD) pumps arranged in a matrix configuration; and an interface, coupled to said controller and said electrohydrodynamic (EHD) pumps, where said interface comprises a first set of electrical lines for passively coupling to said plurality of the electrohydrodynamic (EHD) pumps and a second set of electrical lines for passively coupling to said plurality of the electrohydrodynamic (EHD) pumps, where by using one of said first electrical lines and one or more of said second set of electrical lines, a selected set of said plurality of the electrohydrodynamic (EHD) pumps is activated.

16. The system of claim 15, wherein said system is a printer.

17. The system of claim 15, wherein said system is a laboratory station.

18. A system for moving fluids to a receptor, said system comprising:

a controller;

a fluid delivery array having a plurality of fluid delivery elements arranged in a matrix configuration; and an interface, coupled to said controller and said fluid delivery array, where said interface comprises:

a first set of electrical lines, a plurality of first transistors, where each of said first transistors is coupled to one of said first set of electrical lines;

a plurality of second transistors, where each of said second transistors is coupled to one of said plurality of first transistors; and a second set of electrical lines, where each of said second set of electrical lines is coupled to one of said plurality of first transistors, where by using one or more of said first electrical lines and one or more of said second set of electrical lines, a selected set of said plurality of the fluid delivery elements is loaded with data, where said data are used to activate said selected set of said plurality of the fluid delivery elements simultaneously.

19. the system of claim 18, wherein said fluid delivery elements are an electrohydrodynamic (EHD) pumps.

20. The system of claim 18, wherein said system is a printer.

21. The system of claim 18, wherein said system is a laboratory station.

* * * * *